(12) United States Patent
Popescu

(10) Patent No.: US 6,285,161 B1
(45) Date of Patent: Sep. 4, 2001

(54) BATTERY CELL CHARGING SYSTEM HAVING VOLTAGE THRESHOLD AND BLEEDER CURRENT GENERATING CIRCUITS

(75) Inventor: Serban-Mihai Popescu, San Jose, CA (US)

(73) Assignee: O2 Micro International Limited, Grand Cayman (KY)

( * ) Notice: Subject to any disclaimer, the term of this patent is extended or adjusted under 35 U.S.C. 154(b) by 0 days.

(21) Appl. No.: 09/658,747

(22) Filed: Sep. 11, 2000

(51) Int. Cl.[7] .......................... H01M 10/44; H01M 10/46
(52) U.S. Cl. .............................................................. 320/118
(58) Field of Search .................................... 320/116, 117, 320/118, 119, 162

(56) References Cited

U.S. PATENT DOCUMENTS 5,592,067 * 1/1997 Peter et al. .
5,631,534 * 5/1997 Lewis .
5,650,240    7/1997 Rogers ................................. 429/61
5,652,501    7/1997 McClure et al. ...................... 320/17
5,982,143   11/1999 Stuart ................................. 320/119

* cited by examiner

Primary Examiner—Edward H. Tso
(74) Attorney, Agent, or Firm—Hayes, Soloway, Hennessey, Grossman & Hage, P.C.

(57) ABSTRACT

A balanced battery cell charging circuit is provided. The circuit includes a comparator for comparing the voltage of a battery cell to a predetermined threshold voltage. If the cell voltage exceeds the threshold value, a bleeder current is generated. In one preferred embodiment, the bleeder current is subtracted from the charging current. In another embodiment, the bleeder current is multiplied, and the multiplied bleeder current is subtracted from a total charging current supplied to the cell. To control the charger circuit, current feedback is provided by monitoring the bleeder current generated against a maximum bleeder current, and adjusting the charging current accordingly. The topology of the present invention provides active cell balancing between cells of a battery, and low total power dissipation of the circuit.

21 Claims, 5 Drawing Sheets

BATTERY CELL CHARGING SYSTEM HAVING VOLTAGE THRESHOLD AND BLEEDER CURRENT GENERATING CIRCUITS

BACKGROUND OF THE INVENTION

1. Field of the Invention

The present invention relates to a balanced battery cell charging circuit. More particularly, the present invention relates to a battery charging circuit that monitors the voltage of each cell within the battery, and supplies a charging current depending on the cell voltage. Particular utility of the present invention is a battery charging circuit for portable electronic devices; although the present invention has utility in any system that uses rechargeable batteries.

2. Description of Related Art

Various charger circuits and techniques for charging and recharging secondary cells are known. In one such technique, the cell voltage is monitored and a charge current supplied to the cell is reduced as the cell voltage increases. This technique is based on a recognition that, as the voltage across the cell increases, its charge acceptance decreases. Other battery charging techniques utilize circuitry for sensing the charge accepted by the cell and reducing the charge current supplied to the cell as the accepted charge decreases. In still another battery charging technique, a constant current is supplied to the cell during a first charging interval and a constant voltage is provided to the cell during a second charging interval. The first and second intervals may have predetermined durations or alternatively, may be a function of a battery condition, such as the cell voltage.

As is apparent, many battery charging techniques require measurement of the voltage across the rechargeable cell. Another reason for measuring the cell voltage is to prevent cell damage due to an overvoltage or undervoltage condition. More particularly, certain types of nonaqueous electrolyte battery cells, such as lithium ion cells, are susceptible to damage if charged to too high a voltage or permitted to be discharged to too low a voltage.

Secondary cells are often connected in series to power a load, since the total voltage across the string of series-connected cells is approximately equal to the sum of the voltages across each individual cell. One way to measure the individual cell voltages in a string of series-connected cells is to measure the total voltage across the string of cells and divide the measured voltage by the number of cells. However, this technique provides only a rough approximation of the individual cell voltage since typically, the voltage across each cell varies somewhat.

Another technique for measuring the voltage across individual series-connected cells is to provide a sensing circuit for each such cell and average the outputs of the sensing circuits. For example, a plurality of differential amplifiers may be provided, with input terminals of each amplifier coupled across a respective cell and the output signals of the amplifiers averaged. However, since such a measurement is of the average cell voltage, when using the measurement to control cell charging, some cells will be overcharged and others will be undercharged in accordance with the deviation between their respective voltage and the average measured voltage. Moreover, use of plural sensing circuits results in disadvantageous component duplication and concomitant increases in manufacturing time and cost.

One attempt to solve these attendant problems can be found in U.S. Pat. No, 5,652,501. This patent discloses battery charger/monitor circuit for charging and/or monitoring a plurality of series-connected cells. The disclosed circuit includes a voltage sensor for sensing the voltage across each of the cells to provide a high cell voltage signal proportional to the highest voltage across any of the cells and a low cell voltage signal proportional to the lowest voltage across any of the cells. The circuit is operable in a monitor mode or a charge mode. In the monitor mode, the cells are disconnected from a load if the low cell voltage signal decreases to a first predetermined level. The circuit also includes a controller that provides a control signal in response to the high cell voltage signal, the low cell voltage signal and a current sense signal, for controlling the charging of the cells. In the charge mode, the cells receive a constant charge current until the high cell voltage signal reaches a second predetermined level, after which the voltage across the cell charged to the highest voltage is held substantially constant, causing the charge current to be reduced.

While this alleviates some of the attendant problems associated with the prior art, this attempt does not provide a circuit that considers power dissipation criteria. For IC implementation, there is often a limit as to the maximum power that the IC is permitted to dissipate. Also, for portable device applications, it is necessary to be very power conscious, for obvious reasons. In the aforementioned patent, the disclosed topology reduces the cell voltage once a predetermined threshold is met. However, this cannot accurately monitor power dissipation considerations, nor can charging current be adjusted at a battery cell level.

SUMMARY OF THE INVENTION

Accordingly, the present invention solves the aforementioned drawbacks of the prior art by providing a battery charging circuit that monitors the voltage of each cell within the battery, and supplies a charging current depending on the cell voltage. Unlike the aforementioned prior art references, the present invention controls the battery the current supplied to each battery cell, based on a cell voltage tolerance. Based on the cell voltage parameters, a bleeder current is generated which is subtracted from the charging current, thereby reducing the total charging current delivered to the cell. Additionally, the present invention provides a circuit that minimizes power dissipation by generating a minimal bleeder current, multiplying the bleeder current, and bleeding the multiplied bleeder current from the cell.

In one embodiment, the present invention provides a battery cell charging circuit that includes a charger circuit supplying a charging current to said battery cell. A comparator is used for comparing a battery cell voltage to a predetermined threshold cell voltage. The comparator controls the generation of a bleeder current proportional to the amount the battery cell voltage exceeds the predetermined threshold. The bleeder is subtracted from the charging current supplied to the battery cell.

In method form, the present invention provides method for charging a battery, including the steps of supplying a charging current to a battery cell; comparing the battery cell voltage to a predetermined threshold cell voltage; generating a bleeder current if the cell voltage exceeds said predetermined threshold cell voltage; and subtracting the bleeder current from the charging current.

In another preferred embodiment, the present invention provides a battery cell charging circuit that comprises a battery including a plurality of cells. A charger circuit supplies a charging current to each cell. A first comparator compares a battery cell voltage to a predetermined threshold cell voltage, the comparator also controls the generating a bleeder current proportional to the amount the battery cell voltage exceeds the predetermined threshold. A current mirror generates the bleeder current and a multiple of the bleeder current, the multiple of the bleeder is subtracted from the charging current supplied to the battery cell. A second comparator is provided for comparing the bleeder current to a maximum allowable bleeder current value, and generating a feedback signal to the charger circuit to control the value of the charging current.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
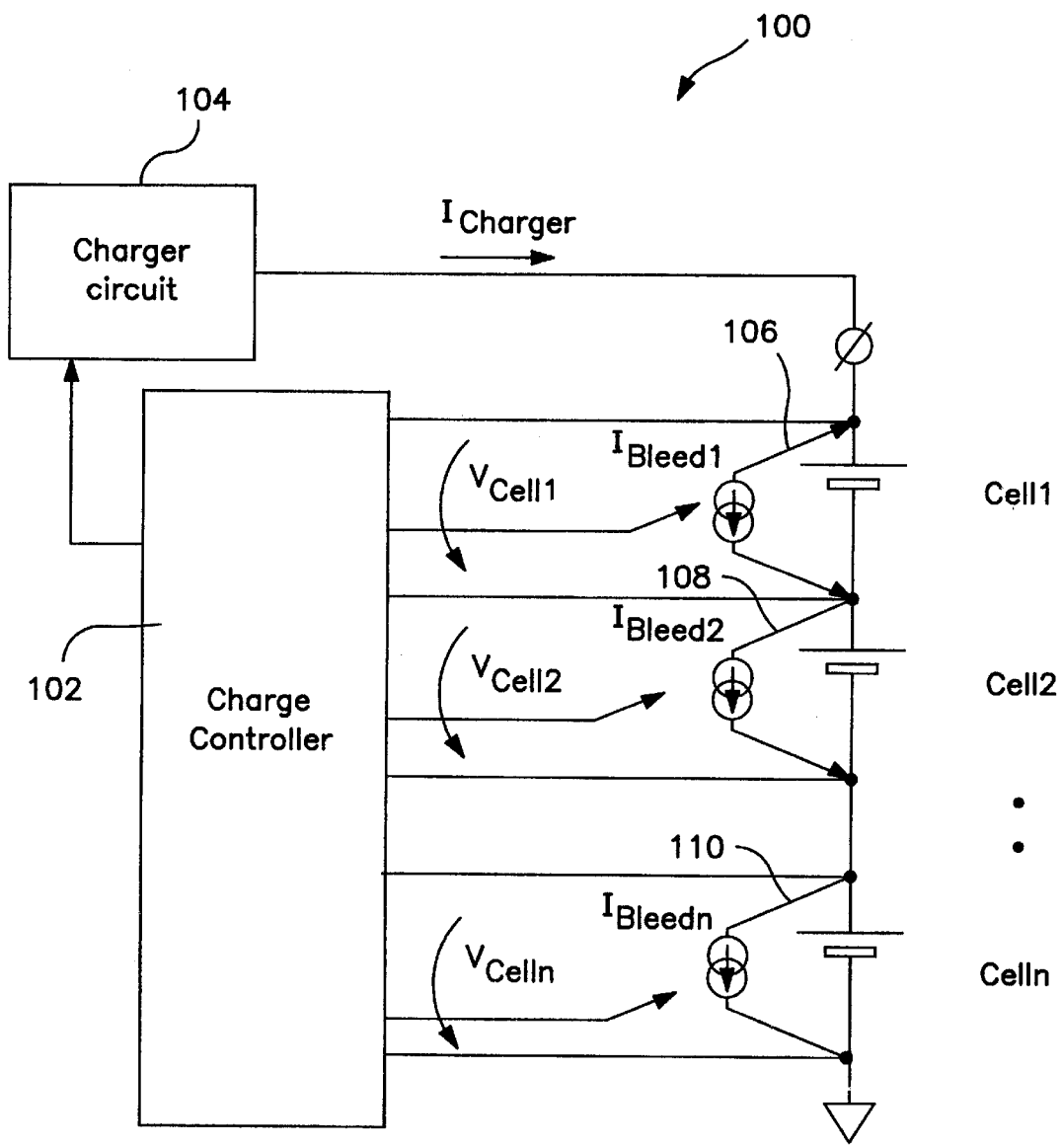
FIG. 1 is a block diagram of an exemplary battery cell charging current balancing circuit of the present invention.

FIG. 1 is a block diagram of an exemplary cell balancing circuit of the present invention. Essentially, the cell-balancing circuit 100 operates to control the charge distribution among non-identical cells in a battery pack during the charge process. The circuit monitors the voltage of each individual battery cell, Cell1, Cell2 . . . Celln, that are connected in series within the battery, and adjusts the amount of charging current based on the cell voltage. The cells in a battery pack typically present a certain degree of charge capacity imbalance. Therefore, in conventional charging systems, the cells with a lower capacity will be charged faster than those with a larger capacity. In such a condition, there is no way to achieve 100% charging for all the cells in the battery, since either the larger capacity cells will remain undercharged, thereby reducing the effective capacity of the battery, or the lower capacity cells will be overcharged, with detrimental effects on long-term cell reliability. Moreover, and especially with Lithium ion batteries, it is imperative that an overcharge condition is not reached, since these batteries can be explosively volatile at overcharged conditions. Accordingly, the present invention alleviates this problem by dynamically varying the charge current supplied to each cell. The charge controller 102 deflects a portion of the charging current that is supplied to each cell by turning on the bleed current source 106, 108 . . . 110 for that cell, based on individual cell voltage conditions. The bleed current source operates to bleed off a portion of the charging current supplied to that cell. This is described in more detail below.

Figure 2:
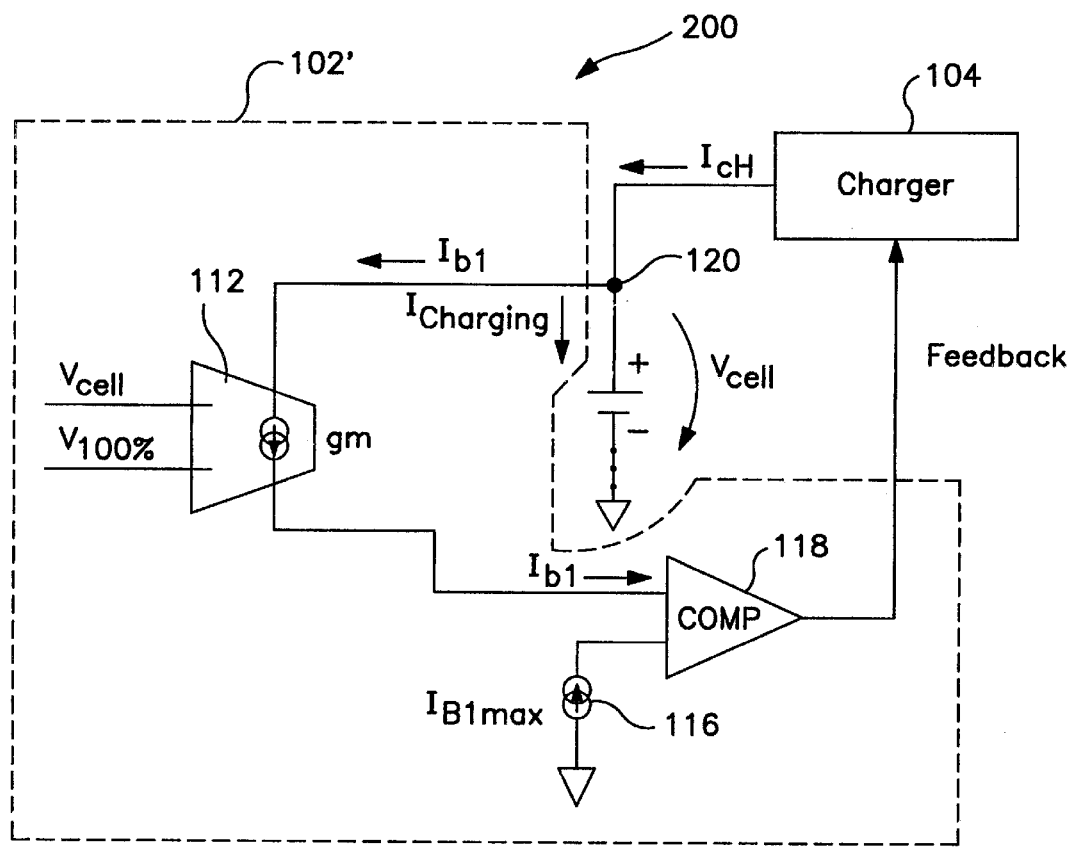
FIG. 2 is an exemplary circuit diagram of the battery cell charging current balancing circuit of one embodiment of the present invention.

FIG. 2 is a more detailed exemplary circuit diagram of the battery cell charging current balancing circuit 200 of one embodiment of the present invention. It should be noted at the outset that controller circuit 102' of FIG. 2 is for a single cell. Each cell in the battery would have a substantially identical circuit. In this example, the controller circuit 102' includes a transconductance amplifier 112 which controls the value of a bleeder current $I_{bl}$. In this embodiment, the bleeder current $I_{bl}$ is bled directly from the total current $I_{ch}$ entering the cell.

At node 120, the charger 104 supplies a total charging current $I_{ch}$. As the voltage of the cell $V_{cell}$ approaches a predetermined threshold reference value ($V_{100\%}$), amplifier 112 generates $I_{bl}$ to bleed off from the charging current being supplied to the cell. Thus, as a general rule, $I_{ch}=I_{charger}+I^{bl}$. Generally, $Vol_{100\%}$ represents the voltage indicative of a fully charged battery, and may be programmably specified by the battery or input into the controller 102' as one of the operating parameters of the particular battery being charged. In a conventional battery, there are typically 3 or 4 cells, but the present invention is generally applicable to any number of cells. Additionally, the charge controller 102' includes a charging current feedback loop that includes current generator 116 and comparator 118, which generates a control signal to adjust the charging current $I_{Ch}$ generated by charger 104.

It should be noted that the reference voltage $V_{100\%}$ and the reference current $I_{blmax}$ can be generated using constant voltage and current sources, respectively. Alternatively, these signals may be generated using a programmable voltage and current source. If, for example, the present invention is utilized in a Lithium ion battery environment, it may be important that the reference voltage and current are accurate to the third decimal place. Thus, it is preferable that $Vol_{100\%}$ and $I_{blmax}$ are generated having a tolerance of +/−0.001 V. and +/−0.01 $\mu$A., respectively. Of course, those skilled in the art will recognize that programmable voltage and current sources are generally available, and all are deemed within the scope of the present invention.

In operation, amplifier 112 compares the battery cell voltage $V_{cell}$ with a predetermined maximum allowable charge voltage $V_{100\%}$. Preferably, amplifier 112 is a transconductance amplifier having unitary output proportional to $g_m$. Amplifier 112 generates a bleeder current $I_{bl}$ that is a function of $g_m$ ($V_{cell}-V_{100\%}$). Based on the recharge power requirement of the battery, charger 104 generates a charging current $I_{Ch}$. Each cell receives a charging current $I_{Charging}$ which is a portion of the total $I_{Ch}$. Each cell receives a charging current, $I_{Charging}=I_{Ch}-I_{bl}$. Since $I_{bl}$ is determined for each cell, it is possible with present invention to prevent the overcharge or fast charge conditions, mentioned previously.

It is desirable that the total bleed current for each cell, $I_{bl}$, is set at some maximum value. Accordingly, $I_{bl}$ is compared to a maximum allowed bleeder current. As shown in the figure, $I_{bl}$ is compared to $I_{blmax}$ 116, at comparator 118. The output of comparator 118 generates a feedback signal to the charger circuit 104, thereby setting the value of $I_{ch}$. As $I_{bl}$ approaches $I_{blmax}$, $I_{ch}$ will be reduced accordingly.

Figure 3:
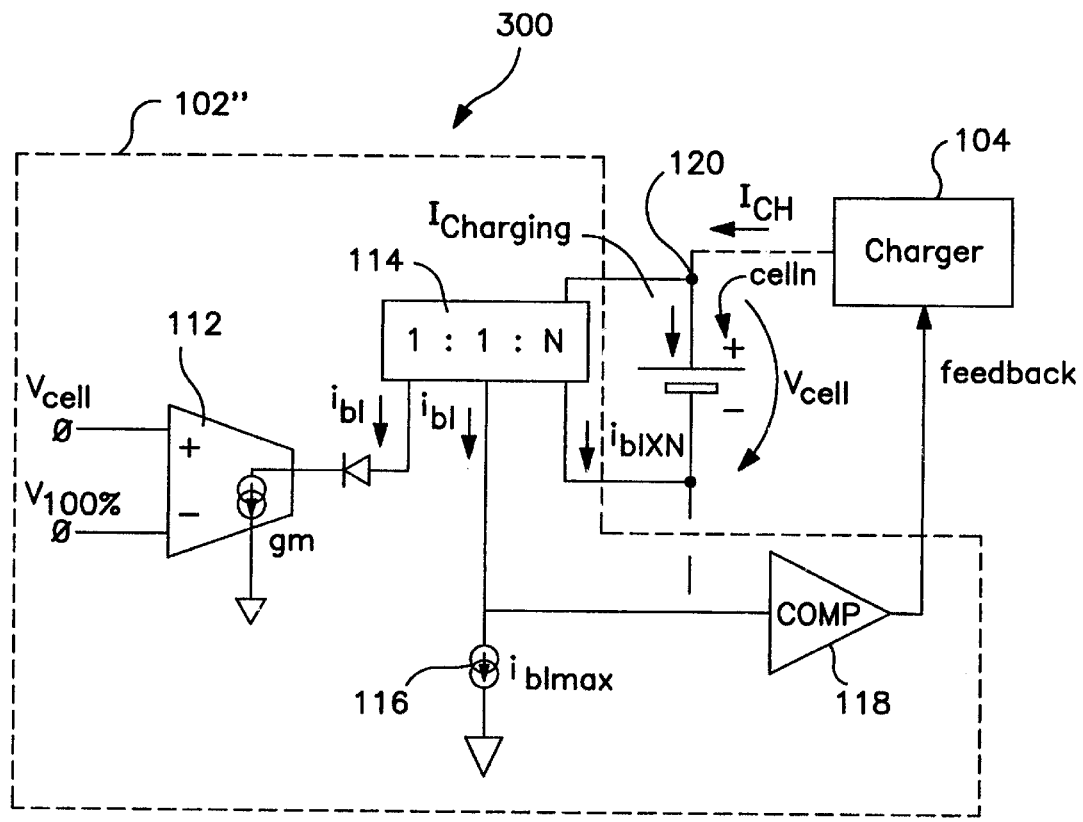
FIG. 3 is an exemplary circuit diagram of the battery cell charging current balancing circuit of another embodiment of the present invention.

FIG. 3 depicts another exemplary circuit diagram of the battery cell charging current balancing circuit 300 of another embodiment of the present invention. It should be noted at the outset that controller circuit 102" of FIG. 3 is for a single cell. Each cell in the battery would have a substantially identical circuit. Similar to the previous embodiment, the controller circuit 102" includes a transconductance amplifier 112 which controls the value of a bleeder current $I_{bl}$. In this embodiment, however, a current mirror 114 is provided which act as a current generator for the bleeder current $I_{bl}$ and as a current multiplier to generate $I_{bl} \times n$, where n represents an arbitrary current multiplier, typically on the order of $10^3$. In this second embodiment, the present invention minimizes power dissipation by recognizing that typically, the bleeder current $I_{bl}$ is non-usable power dissipation (i.e., waste current). Thus, it may be preferable to generate a very small value bleeder current and multiply that value as required for each cell. Since it may be preferable to implement the present invention in an integrated circuit, power dissipation considerations and/or dissipation tolerances must be recognized. Accordingly, the circuit 102" of this embodiment utilizes a multiple of the bleeder current, $I_{bl} \times n$, to act as the actual current bled from a cell. Of course, this is only an example. For certain implementations it may not be necessary or desirable to generate a bleeder current at all. Still other implementations may require a multiple of a different arbitrary value. All such alternatives and modifications are deemed within the scope of the present invention.

Otherwise, the operation of the circuit 102" operates identically to the circuit 102' of FIG. 2 except that $I_{bl} \times n$ is bled from the cell, rather than $I_{bl}$.

Figure 4:
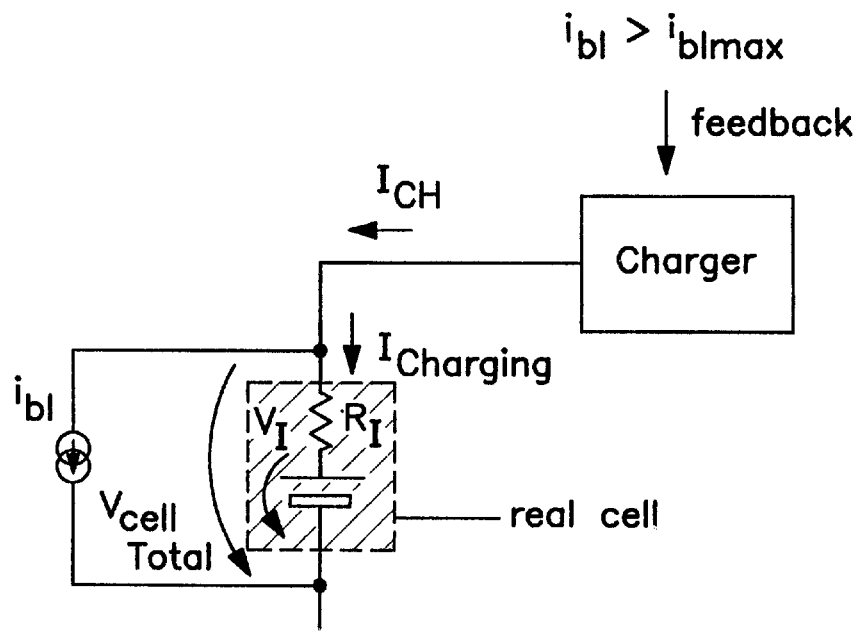
FIG. 4 depict additional details of the circuits of FIGS. 2 and 3.

It is important to recognize, as depicted in greater detail in FIGS. 4 reality, a battery cell is viewed as an internal source $V_I$ and a series internal resistance $R_I$. The internal resistance is an unknown quantity (e.g., ranging from approximately 50 mΩ to 200 mΩ for any given cell in a Lithium Ion battery), and can vastly affect the true charge on the cell, since only the total cell voltage can be monitored. Thus, it is equally important to devise a strategy to accurately charge a cell based solely on the internal source, not the internal resistance. The total voltage of the cell $V_{cell-Total}$ can be expressed as $V_{cell-Total} = V_I + V_{RI}$, where $V_I >> V_{RI}$. Under initial charging conditions, when a cell has not reached a maximum allowable voltage ($V_{100\%}$) and there is therefore no bleeder current bled from that cell, $I_{ch} = I_{charging}$, therefore, $V_{RI} = I_{ch} \times R_I$. When the voltage of the cell exceeds 100% ($V_{cell>V100\%}$), a bleeder current is drained from the cell, as described above. Therefore, $I_{charging} = I_{ch} - I_{bl}$. Thus, $I_{ch}$ has decreased, but the cell is still being charged, albeit at a slower rate, i.e., $V_I$ is increasing. Since $V_{RI} \ I_{charging} \times R_I$, and $I_{charging}$ has decreased, $V_{RI}$ must therefore decrease. (Since $V_I >> V_{RI}$, it does not matter that $V_{RI}$ decreases).

Figure 4A:
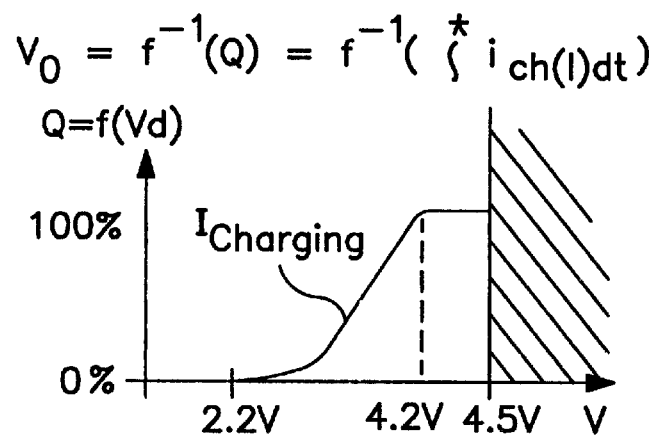
FIG. 4A depicts a plot of charge vs. voltage of a battery cell charged by the circuits of FIGS. 2–4.

However, when $V_{cell-Total} > V_{100\%}$ (by some predetermined amount, e.g., 50 mV), the charger changes state from a constant current source to a constant voltage source. In other words, charger 104 using feedback signal generated by comparator 118 holds the voltage constant across the cell in this condition. Note that, under these conditions, $I_{bl} = I_{blmax}$, and now the charger changes $I_{Ch}$ to keep both the cell voltage constant and $I_{bl} = I_{blmax}$. FIG. 3A depicts a graph the charge of the cell as a function of $V_I$. Recall that $I_{bl} = g_m (V_{cell} - V_{100\%})$, and likewise under these conditions $I_{bl} = I_{blmax}$, this condition forces the charger to keep $V_{cell} = V_{100\%} + I_{bl}/g_m$. But, $V_{cell} = V_I + I_{charging} \times R_I$, so when $V_I$ increases $I_{charging}$ decreases smoothly once the cell has reached capacity. Note that, according to the equation noted in FIG. 4A, the rate of decrease will be smooth unless the internal series resistance changes.

Figure 5:
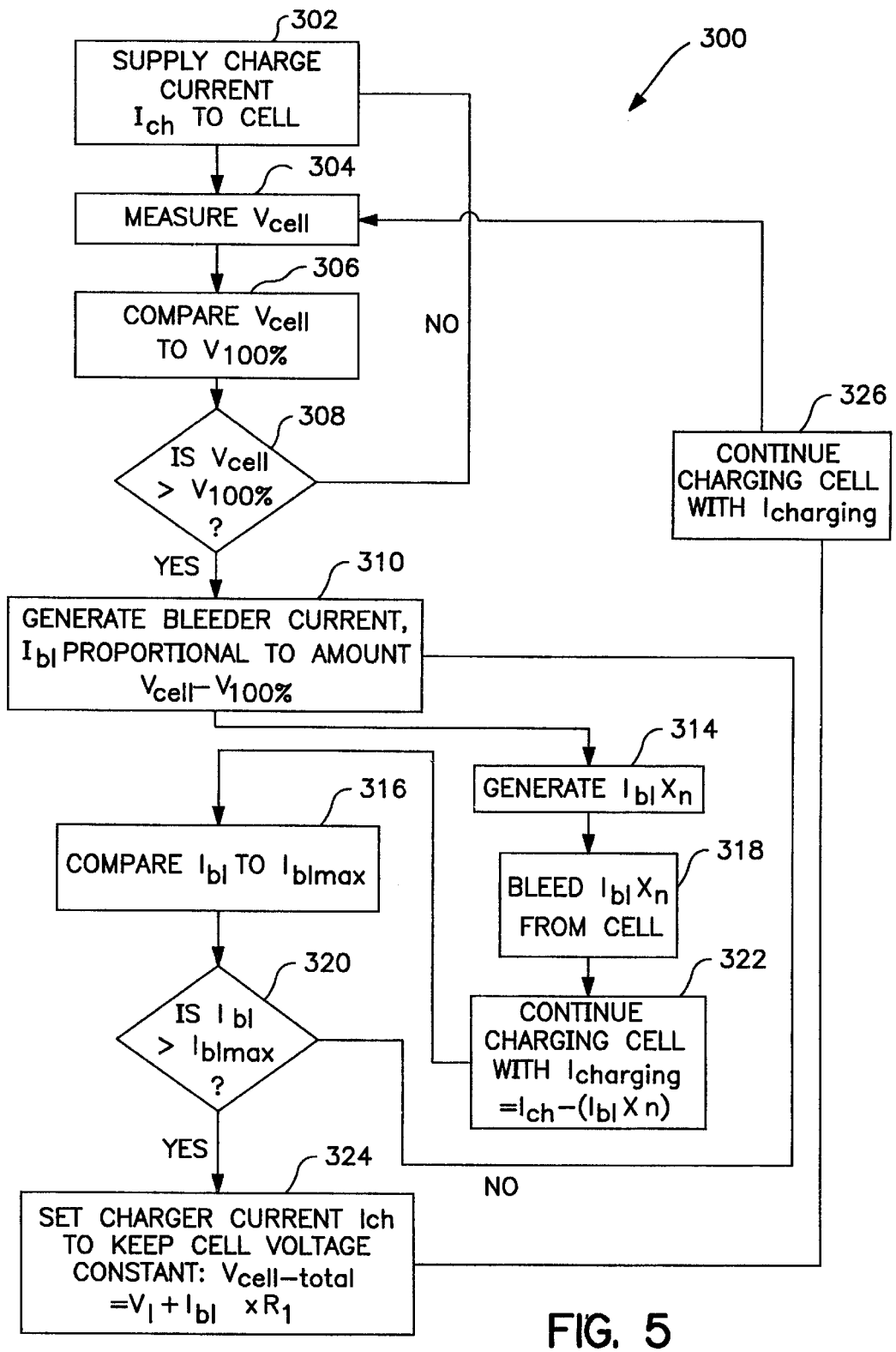
FIG. 5 is a flowchart of the bleeding current generation of the cell charging current balancing circuit of the present invention.

FIG. 5 depicts a flowchart 300 of the overall process of individual cell charging according to the embodiment of FIG. 3. For clarity, reference numbers to the preferred components depicted in FIG. 3 have been omitted. Initially, a charging current $I_{ch}$ is supplied to the cell 302. Actually, since the cells are connected in series, $I_{ch}$ is the current supplied to all the cells, however, the foregoing discussion will be in reference to a single cell, recognizing, of course, that an identical process occurs on all the cells. A measurement is made of the cell voltage $V_{cell}$ 304. The cell voltage is compared to a threshold cell voltage, $V_{100\%}$ 306. It is then determined if $V_{cell} > V_{100\%}$ 308. If not, a charging current $I_{charging}$ (not shown), proportional to Ich is supplied to the cell for charging. If $V_{cell} > V_{100\%}$, a bleeder current, $I_{bl}$ is generated, proportional to the amount that $V_{cell}$ exceeds $V_{100\%}$ 310. In this embodiment, a multiple of the bleeder current, $I_{bl} \times n$ is generated 314. $I_{bl} \times n$ is bled from the cell 318. The charging power to the cell is reduced accordingly, and the cell continues charging with $I_{charging} = I_{ch} - (I_{bl} \times n)$. At the same time, $I_{bl}$ is compared with a maximum bleeder current, $I_{blmax}$ 316. It is determined if $I_{bl} > I_{blmax}$ 320. If not, steps 210–316 continue ($I_{bl} \times n$ continues to be bled from the cell 318). If $I_{bl}$ is greater than (or equal to) $I_{blamax}$, the charging current $I_{ch}$ is set to ensure that the total cell voltage, $V_{cell-Total}$, remains constant (i.e., $I_{bl} = I_{blmax}$). Since the internal source of the cell is still charging (albeit at a much lower rate) the charging current $I_{charging}$ is still supplied to the cell 326, but its value continually decreases (until conditions change). Accordingly, a continuous measurement is made of the cell voltage, 304 and the process repeats, if necessary (i.e., $V_{cell}$ is less than $V_{100\%}$). Since this process is proscribed for each cell in the battery, it is ensured that all other cells that have yet to reach maximum charging capacity receive a charging current of $I_{bl} \times n$, since if one cell has reached its maximum the total charging current supplied by the charger is set to $I_{Iblmax}$. A cell will reach capacity before other cells if either the cell has a smaller capacity compared to other cells, or if the cell has a large internal resistance. The present invention essentially factors out both of these imbalances between cells thereby achieving active cell balancing of cells of different charging capacities and different charging rates.

For the circuit 102' of FIG. 2, the process is similar as described above, except that in steps 314, 318 and 320, $I_{bl} \times n$ is replaced with $I_{bl}$. This value is used to bleed current from the cell.

Thus, it is evident that there has been provided a cell balancing circuit that satisfies the objectives stated herein. Numerous modifications and substitutions will be recognized by those skilled in the art. For example, the charger circuit 104 can include any known topology for generating a charging current for batteries, and preferably is comprised of a single charge/discharge path topology, such as may be found in U.S. application Ser. No. 09/624,918, entitled "Power Management Circuit For Battery Systems", filed Jul. 25, 2000 and assigned to the same assignee, and hereby incorporated by reference in its entirety. Likewise, the current mirror/multiplier circuit 114 can include any conventional and/or custom circuitry to generate the aforementioned current signals.

Those skilled in the art will equally recognize that the transconductance amplifier 112 can be replaced with equivalent circuits, to generate the proportional bleeder current. To provide real-time cell status monitoring and adjustment, it is preferable that the circuit topology 102' and 102" shown in FIGS. 2 and 3 is an analog, as shown. However, an equivalent digital circuit could be implemented using the process depicted in FIGS. 2 and 3.

Still other modifications may be made. Although not shown in the figures, the description above is duly described for multiple cells in a battery pack. To monitor conditions on all the cells in a unified manner, it may be desirable top include have all the feedback signals first fed into an OR gate, the output of which dictating the set condition for the charger circuit. In this way, it is ensured that charging is balanced among the cells. All such modifications are deemed within the scope of the present invention, as defined by the appended claims.

What is claimed is:

1. A battery cell charging circuit, comprising:
   a charger circuit supplying a charging current to said battery cell;
   a comparator for comparing a battery cell voltage to a predetermined threshold cell voltage, said comparator controlling the generation of a bleeder current based on the amount said battery cell voltage exceeds said predetermined threshold, said bleeder being subtracted from said charging current supplied to said battery cell.

2. A circuit as claimed in claim 1, wherein said comparator comprising a transconductance amplifier comparing said battery cell voltage to a predetermined threshold voltage and controlling the generating said bleeder current as a function of $g_m$.

3. A circuit as claimed in claim 1, further comprising a second comparator for comparing said bleeder current to a maximum allowable bleeder current value, and generating a feedback signal to said charger circuit to control the value of said charging current.

4. A circuit as claimed in claim 3, further comprising a constant current source generating said maximum allowable bleeder current value.

5. A circuit as claimed in claim 3, further comprising a programmable current source for programmably generating said maximum allowable bleeder current value.

6. A circuit as claimed in claim 1, further comprising a constant voltage source for generating said threshold cell voltage.

7. A circuit as claimed in claim 1, further comprising a programmable voltage source for generating said predetermined threshold cell voltage.

8. A circuit as claimed in claim 1, wherein said battery comprises a lithium ion battery, said charging current is approximately 2 Amps, and said predetermined maximum cell voltage is approximately 4.200 Volts.

9. A circuit as claimed in claim 1, wherein said bleeder current is equal to about 50 $\mu$A., and said multiple is equal to about 1000.

10. A method for charging a battery, comprising the steps of:
    supplying a charging current to a battery cell;
    comparing the battery cell voltage to a threshold cell voltage;
    generating a bleeder current if said cell voltage exceeds said threshold cell voltage; and
    subtracting said bleeder current from said charging current.

11. A method as claimed in claim 10, wherein said step of generating said bleeder current further comprises the step of multiplying said bleeder current by a predetermined constant and subtracting the multiplied bleeder current from said charging current.

12. A method as claimed in claim 10, further comprising the steps of:
    comparing said bleeder current to a maximum allowable bleeder current value; and
    adjusting the value of said charging current if said bleeder current equals or exceeds said maximum allowable bleeder current value.

13. A method as claimed in claim 12, further comprising the step of:
    setting the bleeder current to equal the maximum allowable bleeder current value when said bleeder current equals or exceeds said maximum allowable bleeder current value, and subtracting said maximum allowable bleeder current from said charging current.

14. A battery cell charging circuit, comprising a battery including a plurality of cells; a charger circuit for supplying a charging current to each said cell; a first comparator for comparing a battery cell voltage to a predetermined threshold cell voltage, said comparator controlling the generating a bleeder current proportional to the amount said battery cell voltage exceeds said predetermined threshold; a current mirror for generating said bleeder current and a multiple of said bleeder current, said multiple of said bleeder being subtracted from said charging current supplied to said battery cell; and a second comparator for comparing said bleeder current to a maximum allowable bleeder current value, and generating a feedback signal to said charger circuit to control the value of said charging current.

15. A circuit as claimed in claim 14, wherein said comparator comprising a transconductance amplifier comparing said battery cell voltage to a predetermined threshold voltage and controlling the generating said bleeder current as a function of $g_m$.

16. A circuit as claimed in claim 14, further comprising a constant current source generating said maximum allowable bleeder current value.

17. A circuit as claimed in claim 14, further comprising a programmable current source for programmably generating said maximum allowable bleeder current value.

18. A circuit as claimed in claim 14, further comprising a constant voltage source for generating said predetermined threshold cell voltage.

19. A circuit as claimed in claim 14, further comprising a programmable voltage source for generating said predetermined threshold cell voltage.

20. A circuit as claimed in claim 14, wherein said battery comprises a lithium ion battery, said charging current is approximately 2 Amps, and said predetermined maximum cell voltage is approximately 4.200 Volts.

21. A circuit as claimed in claim 14, wherein said bleeder current is equal to about 50 $\mu$A., and said multiple is equal to about 1000.

* * * * *